Patented May 15, 1945

2,375,786

UNITED STATES PATENT OFFICE 2,375,786

METHOD OF PRODUCING IMPROVED CALCIUM SULPHITE

Gerald Haywood, Westernport, Md., and Wright M. Welton, Piedmont, W. Va., assignors to West Virginia Pulp and Paper Company, New York, N. Y., a corporation of Delaware No Drawing. Application August 2, 1940, Serial No. 350,156

18 Claims. (Cl. 23—129)

This invention relates to an improved method of producing calcium sulphite in a bright, finely divided state, satisfactory for use in the manufacture of paper and as a filler or pigment in inks, paints, protective coatings and the like. It relates also to the improved product resulting from the novel process. This product is particularly desirable as an ingredient of the coating composition applied to the surface of a web of paper in the production of coated papers. It is also highly satisfactory as a filler for paper, in lieu of the regularly known fillers, such as china clay, calcium carbonate, and other types of calcium sulphite, although it may be more expensive to produce than these other fillers. As an ingredient of a coating mixture, the element of expense is not so important and the added expense, if any, of the improved product is offset by other savings made possible through its use and by the improved results.

It has heretofore been suggested that calcium sulphite produced by a reaction between concentrated milk of lime and gaseous sulphur dioxide, brought about by contacting the milk of lime in a finely divided state with an atmosphere relatively rich in sulphur dioxide, may be used as a filler for paper or as an ingredient of a coating composition. Calcium sulphite so produced forms an excellent filler for paper, being brighter and capable of producing greater opacity than commonly used fillers, such as china clay and chalk. However, it is not entirely free from objection when it is to be used as an ingredient of a coating composition. The amount of casein or similar adhesive material required to bring about an appropriate bond between the coating and the fibers of the paper increases the cost of the coating composition unduly. This is probably due to the porous character of the material and may also be due to the presence of impurities, particularly free lime, in the calcium sulphite produced by the method set forth above.

It has been an important object of the present invention to produce calcium sulphite in such a state that it is highly satisfactory for use in large percentage in a coating composition. It has been found that in the employment of the improved process, calcium sulphite may be produced in a more finely divided state and of greater purity than previously known types of calcium sulphite. Its apparent density is also greater, e. g., 1 cc. of the improved material in a dry state weighs in the neighborhood of 1.4 gms. whereas the porous product of the prior methods under the same conditions has a weight only of about .5 gms per cc. It has been found that the product of the improved process may be effectively bonded to the fibers of a sheet of paper through the use of a smaller amount of adhesive or size, such as casein, than prior known types of calcium sulphite. Furthermore, coated papers produced through the use of the improved calcium sulphite are superior in many respects to coated papers heretofore produced.

In accordance with the present invention, calcium sulphite is first produced in a finely divided state by any of the previously known methods for producing the product in a form suitable for use as a filler in paper. Preferably, however, it is produced, as previously explained, by the reaction of a relatively concentrated milk of lime suspension in the form of a fine spray with sulphur dioxide in a gaseous state present in an atmosphere rich in sulphur dioxide. The method and apparatus preferably employed for this purpose are fully set forth in the Haywood Patents No. 1,984,188 and No. 2,191,467 and in the co-pending Haywood application Ser. No. 756,631 filed December 8, 1934, now U. S. Patent 2,210,268. Any of the variations in the process and apparatus set forth in said patents and application may be followed. However, the preferred procedure involves the reaction between a milk of lime suspension at a concentration of about 110 grams per liter and an atmosphere consisting of about 17% sulphur dioxide and the balance the products of combustion of sulphur in air in a sulphur burner. A reaction chamber or absorber is used, the milk of lime being introduced into the absorber to an extent sufficient only to occupy a small percentage of the volume of the absorber while the atmosphere rich in sulphur dioxide occupies the major portion of the volume of the absorber. Suitable agitating means are employed to whip the milk of lime into a fine spray and bring about the desired reaction between this spray and the sulphur dioxide. Preferably the milk of lime is continuously circulated, being withdrawn from the absorber at one point and returned at another. As explained in the prior patents and application, the concentration of the milk of lime may be varied, although it is preferably maintained between ½ and 1½ pounds of lime per gallon of water. In lieu of a milk of lime suspension, other lime-bearing suspensions, such as a suspension of finely divided calcium carbonate, may be employed. The reacting atmosphere may contain between 7 and 20% sulphur dioxide and while it is preferably derived by the burning of sulphur in the manner indicated, it may, if desired, be derived from other sources, such as are frequently available around a paper mill or other industrial plants.

Now, according to the prior methods disclosed in the patents and application mentioned, the reaction is carried on until the lime has been substantially completely converted into calcium sulphite. The reaction may be carried to the point at which the suspension is slightly acid, in which case it is substantially neutralized by the addition of an alkali or the reaction may be arrested while the suspension is still slightly on the alkaline side and it may then be neutralized by a small amount of acid. The resulting product is extremely fine and highly satisfactory for use as a filler in paper but, as previously set forth, it is not entirely satisfactory as an important ingredient of a coating composition. According to the present invention, this material is greatly improved for use as a filler and more especially for use as an ingredient of a coating composition by the subsequent treatment now to be explained.

After the reaction between the milk of lime and the sulphur dioxide in the atmosphere derived from the sulphur burner is substantially complete, the suspension may either be passed to another chamber for further treatment or the further treatment may be carried out in the same absorber. This further treatment consists in reacting the suspension with gaseous sulphur dioxide, preferably of a concentration of between 50 and 100%. Such a gas may be derived, for example, by the distillation of liquid sulphur dioxide or may be the relief gases from a sulphite digester. In lieu of sulphur dioxide an acid may be employed which will release sulphur dioxide by reaction with the calcium sulphite.

Excellent results have been obtained by first removing the major portion of the suspending liquid from the original calcium sulphite precipitate, either or by filter pressing or by allowing the calcium sulphite to settle and then decanting the supernatant liquid, and forming a cake of the calcium sulphite in a plastic state. This cake should be of such a consistency that it may be worked or puddled in a suitable vessel or chamber in the presence of the previously mentioned atmosphere of high $SO_2$ concentration. It will be found that the material under these conditions will at first become thicker but upon continued working it will become thinner again and will finally reach a state in which it may be pumped. Apparently, the structure of the material undergoes some change, in the course of the puddling process, by which water is released or made available for increasing the fluidity of the material. The thinning of the material may also be due in part to the conversion of a substantial part of the original solids into calcium bisulphite.

While the amount of time required for the extra sulphitation may vary with the results desired and the amount of additional sulphur dioxide to be reacted, and also the quantities of the various materials dealt with, it has been found that in dealing with a 100 pound batch of calcium sulphite the puddling operation could be carried to a satisfactory point within about an hour. This further sulphitation of the suspension insures the almost complete reaction of the lime in the original suspension, thus eliminating most of the lime cores, and results in the conversion of a portion of the calcium sulphite into calcium bisulphite. The further sulphitation is preferably carried on through the use of an excess of sulphur dioxide to the extent of between ⅛ and 2½ mols based upon the calcium sulphite produced in the reaction. In general, it has been found that the more of the substantially pure gaseous sulphur dioxide that is employed and consequently the more calcium bisulphite that is formed, the finer will be the particles of the residual calcium sulphite. The yield of the fine calcium sulphite, of course, diminishes with the increase in the excess of the sulphur dioxide employed. If as much as 2½ mols excess of sulphur dioxide is employed, the yield of calcium sulphite will be about 60% of that resulting from the normal reaction between $SO_2$ and milk of lime. On the other hand, if only ⅛ mol excess of sulphur dioxide is employed, the yield of the residual calcium sulphite will be about 90% of the theoretical normal.

In any case it is desirable to carry out the treatment with excess $SO_2$ at a high concentration of the suspension. As explained, the water should be only sufficient to enable the material to be readily puddled. Preferably the concentration will be between 400 and 500 g./l. or even higher, although concentrations of $CaSO_3$ down to about 200 g./l. may be employed with fair results. In view of the high concentration, the pH of the material will be relatively low, preferably in the neighborhood of 3 or between 3 and 4, although it may vary between 2.5 and 5.5. To increase the solubility of the $SO_2$ in the suspending water, the material is preferably kept as cool as possible during the extra sulphitation. For this purpose special cooling arrangements are preferably employed around the chamber in which the material is being puddled so that the temperature will be in the neighborhood of 50 to 60° F. Satisfactory results may, however, be obtained at somewhat higher temperatures up to, say, 100° F.

After the extra sulphitation has been carried to the desired extent, the remaining calcium sulphite is removed from the suspending liquor in any suitable way, as by filtration. The separated, suspending liquid, containing a substantial amount of calcium bisulphite, may be utilized in a variety of different ways. If desired, it may be reacted with milk of lime by pouring the bisulphite into a body of milk of lime and stirring the mixture thoroughly. The resulting precipitated calcium sulphite will be found satisfactory for use as a filler in paper.

The calcium sulphite removed from the original suspending liquid after the over-gassing or extra sulphitation should be washed and neutralized by the addition of an appropriate quantitiy of an alkali, such as caustic soda, calcium carbonate or lime. This product, in addition to its extreme fineness, it being far bulkier, by a net bulk test, than the products resulting from any previously known processes, has other improved characteristics as well. The extra sulphitation appears to remove all traces of iron, the iron apparently going into the bisulphite solution. This leaves the residual calcium sulphite in an extremely white and bright state, superior to prior types of calcium sulphite. Another important advantage of the over-gassed product is the ability to size it readily with casein or similar adhesive materials employed in the coating of paper. This will be made apparent by the tests which will be later explained.

In lieu of subjecting the original calcium sulphite produced, for example, in accordance with the methods set forth in the above-mentioned patents and application, to overgassing or extra sulphitation, it has been found that somewhat similar results may be obtained by subjecting this original calcium sulphite to acid treatment, as suggested above. For example, sulphuric acid, hydrochloric acid, phosphoric acid, nitre-cake, aluminum sulfate, or alum or the like may be added to the original calcium sulphite after it is removed from its original suspension. The quantity of acid employed may vary according to the results desired. Apparently, the more acid that is used, the finer will be the remaining calcium sulphite. Ordinarily, it will be found desirable to convert about 20% of the original calcium sulphite into the salt of the acid used, such as the chloride or sulphate or phosphate. However, good results may be obtained by converting only 10% of the calcium sulphite into such salts and better results may be obtained by converting between 30 and 40%, although this adds considerably to the expense. The same considerations of concentration, temperature and pH, as explained in connection with the over-gassing treatment, should be observed in the acid treatment.

The residual calcium sulphite removed from the acid is of a very bright character and is extremely fine. As in the case of the overgassed material, its bulk will be found considerably higher than the original calcium sulphite prior to the acid treatment. Moreover, the acid-treated material will be found capable of being readily sized with casein so as to make it highly satisfactory for use as an ingredient of a coating composition. Another advantage of the overgassed or the acid-treated material is the elimination of the major portion of the free lime which is invariably present in ordinary calcium sulphite as heretofore produced. Even the overgassed or acid-treated material contains about 2% lime but this is not sufficient to cause any serious difficulty in the mixture of the calcium sulphite with casein. When an excessive amount of lime is present, however, it appears to react with the casein in such a way as to greatly increase the viscosity of the mixture and make it difficult to brush or cause to flow.

As a specific example of the conduct of the improved method, a quantity of calcium sulphite, as produced commercially by the preferred method disclosed in the Haywood patents and application previously mentioned, was subjected to a series of different treatments in accordance with the present invention. A sample of this material was treated with sulphuric acid in sufficient quantity to convert approximately 20% of the calcium sulphite into the sulphate. Another sample of the same original material was treated with sufficient hydrochloric acid to convert a like amount to calcium chloride. Still another sample of the original material was subjected to an over-gassing treatment with substantially 100% pure sulphur dioxide in sufficient amount to react the original lime with an excess of 0.2 mol of sulphur dioxide. As far as possible the same conditions of operation were maintained in the conduct of all of these treatments. The residual, unconverted calcium sulphite remaining after each of these treatments was then subjected to various tests. So also a sample of the original, untreated calcium sulphite was subjected to the same tests. These tests showed the overgassed and acid-treated materials to be greatly superior to the ordinary, untreated calcium sulphite in many respects. The treated materials were much bulkier and brighter.

Hand-coated sheets of paper were produced, making use of the several treated and untreated materials indicated, in each instance utilizing casein to the extent of 15% of the dry weight of the calcium sulphite pigment materials used. The same procedure was followed in each instance in the production of the hand-coated sheets and a coating of about 15 pounds (for a ream of 500 sheets 25 x 38 inches) was applied to each. The sheets so produced were subjected to a brightness test on a General Electric brightness tester and to a pick test by the use of Dennison's graded waxes. The results of these tests are indicated in the following table:

HAND COATED SHEETS

15% Sizing

|  | (1) Untreated | (2) $H_2SO_4$ | (3) HCl | (4) $SO_2$ |
|---|---|---|---|---|
| Brightness (G. E.) | 85.4 | 86.4 | 88.2 | 87.7 |
| Wax (Dennison's) | #1 coating | #6 stock | #5 stock | #7 stock |

It will be noted that in the brightness tests the sheet formed with the untreated material was somewhat poorer than those formed with the treated materials and in the pick test the sheet with untreated material was considerably worse than the others. The coating was removed by even the least tacky of the graded waxes. The treated materials, on the other hand, were bound much more firmly by the casein to the fibrous stock. A much more tacky wax was required to remove them and in removing the coatings with these other substances, a portion of the fibrous stock itself was removed.

When excess sulphur dioxide is used to convert a portion of the original, normal calcium sulphite into calcium bisulphite, it has been found advantageous, from the standpoint of the character of the product, to use relatively high percentages of excess. Of course, in view of the conversion of a greater amount of the calcium sulphite into the bisulphite, as a result of the use of higher excesses of $SO_2$, the yield of the final calcium sulphite will be lower. The table which will be shortly given shows the results obtained from the treatment of milk of lime at 112 g./l. concentration with varying quantities of $SO_2$. In each case the milk of lime was whipped into a fine spray in an atmosphere of $SO_2$. One sample was subjected to reaction with simply a molecular equivalent of $SO_2$, the next sample was subjected to treatment with a 12% excess of $SO_2$ over the molecular equivalent, the next sample to a 25% excess of $SO_2$, the next to a 50% excess and the last to a 100% excess. The percentage of yield in each case is indicated in the second column of the table. The settling point, after 24 hours, of 10 gms. of each of the products in 100 cc. of distilled water, after being thoroughly shaken, is indicated in the third column. Hand-sheets of paper coated with each of the substances, utilizing 13% by weight of casein, were formed from each of the samples and subjected to brightness, gloss, and Dennison wax tests. The brightness was determined by a General Electric brightness tester, the coating applied to the hand-sheets for the purpose of this test being equivalent to a 15 lb. coating on a ream of 500 sheets of paper 25 x 38 inches; the gloss was determined by a Bausch & Lomb glarimeter, and the Dennison wax test was conducted in the conventional way with the Dennison graded waxes to determine which wax would first cause the coated surface to pick or pull. The results of these tests were as follows:

| Mol. fraction SO₂ | Per cent yield | 24 hr. bulk | Brightness | Coated sheets | |
|---|---|---|---|---|---|
| | | | | Gloss | Wax |
| 1.00 | 100 | 23 | 78.2 | 31 | #1 |
| 1.12 | 78.2 | 39.5 | 79.6 | 31 | #4 |
| 1.25 | 74.5 | 84.5 | 82.9 | 63 | #6 |
| 1.50 | 65.8 | 88.5 | 84.9 | 67 | #6 |
| 2.00 | 60.7 | 82.0 | 87.2 | 68 | #7 |

It will be noted from the foregoing that at some point between the 12 and 25% excess of SO₂ a very remarkable increase in the bulk of the product resulted. A considerable improvement in brightness and gloss also resulted. Moreover, in the use of a relatively small quantity of casein, i. e., 13%, the products formed by the use of an excess of more than 12% of SO₂ were firm to a quite tacky wax, i. e., No. 6 or higher, equivalent to a very tacky ink. Even the 12% excess SO₂ very largely increased the firmness of the coating to the tacky waxes.

Other tests have shown that a considerable improvement results from the use of higher concentrations of the suspensions dealt with, particularly in the acidifying or over-gassing stage of the process. This improvement is most noticeable in the percentage of yield. For example, an excess of 100% of SO₂ in the over-gassing process may be utilized in dealing with concentrations of the suspension in the neighborhood of 400 to 500 g./l. without dropping the yield below about 75%. At the same time the various characteristics of the product, such as its bulk, brightness, gloss and firmness to tacky waxes, when used as a coating ingredient, were improved to an even greater extent than in the use of the same percentage of excess of SO₂ at lower concentrations. This is apparently due to the fact that a lower pH is maintained by the same excess at lower concentrations. In this connection it should also be observed that the cooling of the reacting materials to a point below 100° F., and preferably to a point between 50 and 60° F., assists in retaining a greater percentage of the excess SO₂ in solution and thus assists in maintaining a lower pH and enhances the results obtainable from the practice of the invention.

While the improved method and the characteristics of the resulting, improved product have been described in considerable detail, it will be understood that various modifications may be made in the steps and operating conditions employed and in the specific characteristics of the product without departing from the general principles and scope of the invention. The terms and expressions employed herein have been used as terms of description and not of limitation.

Reference is hereby made to application Serial No. 383,148 by the present applicants.

What we claim is:

1. A method of producing finely-divided calcium sulphate for filler and pigment purposes which comprises precipitating calcium sulphate from a lime bearing suspension by reaction of said suspension with sulphite ions, and subjecting the resulting precipitate at a concentration of between 200 to 500 g./l. to treatment with an acid until the pH of the resulting slurry is below approximately 3.1 and approximately 10 to 40% of the said precipitate is converted into a soluble salt, the extent of the conversion being in inverse relation to the concentration of the said precipitate.

2. A method of producing finely-divided calcium sulphite for filler and pigment purposes which comprises precipitating calcium sulphite from a lime bearing suspension by reaction of said suspension with sulphite ions, and subjecting the resulting precipitate at a concentration of between 200 to 500 g./l. and at a temperature between 50 and 100° F. to treatment with an acid until the pH of the resulting slurry is below approximately 3.1 and approximately 10 to 40% of the said precipitate is converted into a soluble salt, the extent of the conversion being in inverse relation to the concentration of the said precipitate.

3. A method of producing finely-divided calcium sulphite for filler and pigment purposes which comprises precipitating calcium sulphite from a lime bearing suspension by reaction of said suspension with sulphite ions, and subjecting the resulting precipitate at a concentration of between 200 to 500 g./l. to treatment with a gaseous medium which is more than 50 per cent sulphur dioxide until the pH of the resulting slurry is below approximately 3.1 and approximately 10 to 40% of the said precipitate is converted into a soluble salt, the extent of the conversion being in inverse relation to the concentration of the said precipitate.

4. A method of producing finely-divided calcium sulphite for filler and pigment purposes which comprises precipitating calcium sulphite from a lime bearing suspension by reaction of said suspension with sulphite ions, and subjecting the resulting precipitate at a concentration of between 200 to 500 g./l. to treatment with alum until the pH of the resulting slurry is below approximately 3.1 and approximately 10 to 40% of the said precipitate is converted into a soluble salt, the extent of the conversion being in inverse relation to the concentration of the said precipitate.

5. A method of producing finely divided calcium sulphite suitable for filler and pigment purposes, which comprises precipitating calcium sulphite from a calcium bearing suspension of an ionizable calcium compound by reaction of said suspension with sulphite ions, treating the resulting precipitate at a concentration of between 200 and 500 g./l. with sulphuric acid until approximately 10 to 40% of said precipitate is converted into sulphate, and separating the residual precipitate from the acidified liquor.

6. A method of producing finely divided calcium sulphite suitable for filler and pigment purposes, which comprises precipitating calcium sulphite from a calcium bearing suspension of an ionizable calcium compound by reaction of said suspension with a gaseous medium which is between 10 and 20% sulphur dioxide, and treating the resulting precipitate at a concentration of at least 200 g./l. with substantially pure sulphur dioxide until the pH of the suspension is depressed below 4.0 and between 10 and 40% of the precipitate is converted to calcium bisulphite.

7. A method of producing finely divided calcium sulphite suitable for filler and pigment purposes, which comprises precipitating calcium sulphite from a calcium bearing suspension of an ionizable calcium compound by reaction of said suspension with a gaseous medium containing from 7% to 20% sulphur dioxide, and subsequently subjecting the resulting precipitate at a concentration of at least 200 g./l. to the action of a gaseous medium which is more than 50% sulphur dioxide, until the pH is depressed to below 4.0 and approximately 10% to 40% of the precipitate has been dissolved.

8. A method of producing finely-divided calcium sulphite for filler and pigment purposes which comprises precipitating calcium sulphite from a calcium bearing suspension of an ionizable calcium compound by reaction of said suspension with sulphite ions, subjecting the resulting precipitate at a concentration of between 200 to 500 g./l. to treatment with an acid until the pH of the resulting slurry is below approximately 4 and approximately 10 to 40% of the said precipitate is converted into a soluble salt, and separating the residual precipitate from the acidified liquor.

9. A method of producing finely-divided calcium sulphite for filler and pigment purposes which comprises precipitating calcium sulphite from a calcium bearing suspension of an ionizable calcium compound by reaction of said suspension with sulfite ions, subjecting the resulting precipitate at a concentration of between 200 to 500 g./l. and at a temperature between 50 and 100° F. to treatment with an acid until the pH of the resulting slurry is below approximately 4 and approximately 10 to 40% of the said precipitate is converted into a soluble salt, and separating the residual precipitate from the acidified liquor.

10. A method of producing finely-divided calcium sulphite for filler and pigment purposes which comprises precipitating calcium sulphite from a calcium bearing suspension of an ionizable calcium compound by reaction of said suspension with sulphite ions, subjecting the resulting precipitate at a concentration of between 200 to 500 g./l. to treatment with a gaseous medium which is more than 50 per cent sulphur dioxide until the pH of the resulting slurry is below approximately 4 and approximately 10 to 40% of the said precipitate is converted into a soluble salt, and separating the residual precipitate from the acidified liquor.

11. A method of producing finely-divided calcium sulphite for filler and pigment purposes which comprises precipitating calcium sulphite from a calcium bearing suspension of an ionizable calcium compound by reaction of said suspension with sulphite ions, and subjecting the resulting precipitate at a concentration of between 200 to 500 g./l. to treatment with alum until the pH of the resulting slurry is below approximately 4 and approximately 10 to 40% of the said precipitate is converted into a soluble salt, and separating the residual precipitate from the acidified liquor.

12. A method of producing a finely-divided calcium sulphite suitable for filler and pigment purposes which comprises precipitating calcium sulphite from a calcium bearing suspension of an ionizable calcium compound by reaction of said suspension with sulphite ions, subjecting the resulting precipitate at a concentration between 400 and 500 g./l. and at a temperature between 50° F. and 100° F. to treatment with an acid and converting approximately 10% to 40% of the precipitate into a soluble salt, the pH at the end of the treatment being below 4.0, and separating the residual precipitate from the acidic liquor.

13. A method of producing finely-divided calcium sulphite suitable for filler and pigment purposes which comprises precipitating calcium sulphite from a calcium bearing suspension of an ionizable calcium compound by reaction of said suspension with sulphite ions, treating the resulting precipitate with gaseous sulphur dioxide, converting approximately 10 to 40% of the precipitate with calcium bisulphite, said treatment being conducted at a concentration of between 400 and 500 g./l. at a temperature between 50° F. and 100° F., the pH at the end point being below 4.0, and separating the residual precipitate from the acidic liquor.

14. A method of improving a finely-divided calcium sulphite to render it more suitable for filler and pigment purposes which comprises subjecting the calcium sulphite at a concentration of approximately 400 to 500 g./l. to treatment with an acid agent until approximately 10 to 40% of the sulphite is dissolved and the pH is below 4.0 and separating the residual precipitate from the acidified liquor.

15. A method of improving a finally-divided calcium sulphite to render it more suitable for filler and pigment purposes, which comprises subjecting the calcium sulphite at a concentration of between 400 and 500 grams per liter to reaction with sulphurous acid until approximately 10 to 40% of the sulphite is converted to bisulphite and the pH is below 4.0.

16. A method of producing finely-divided calcium sulphite for filler and pigment purposes which comprises preparing a lime suspension containing at least 110 grams of lime per liter of suspension, forming a spray of said suspension in an atmosphere containing sulphur dioxide, reacting said suspension with an excess of sulphur dioxide, said excess being greater than one-eighth of a mol for each mol of lime, and stopping said reaction after the pH of the suspension is below 4.0 and the lime after having been converted to calcium sulphite was partly converted to calcium bisulphite to the extent of approximately 10% to 40%, and separating the calcium sulphite from the acidic liquor.

17. A method of producing finely-divided calcium sulphite for filler and pigment purposes which comprises preparing a lime suspension containing at least 110 grams of lime per liter of suspension, forming a spray of said suspension in an atmosphere containing sulphur dioxide, reacting said suspension with an excess of sulphur dioxide, said excess being greater than one eighth of a mol for each mol of lime, the concentration of sulphur dioxide in the atmosphere being increased from the range of 7% to 20% at the beginning of the reaction to the range of 50% to 100% at the end of the reaction, and stopping said reaction after the pH of the suspension is below 4.0 and the lime after having been converted to calcium sulphite was partly converted to calcium bisulphite to the extent of approximately 10% to 40%, and separating the calcium sulphite from the acidic liquor.

18. A method of producing finely divided calcium sulphite suitable for filler and pigment purposes which comprises precipitating calcium sulphite from a calcium bearing suspension of an ionizable calcium compound by reaction of said suspension with sulphite ions, treating the resulting precipitate at a concentration of between 200 and 500 g./l. with sufficient alum to depress the pH below 4.0 and converting between 10 and 40% of the precipitate into calcium sulpho-aluminate and separating the residual precipitate from the acidified liquor.

GERALD HAYWOOD.
WRIGHT M. WELTON.

CERTIFICATE OF CORRECTION.

Patent No. 2,375,786.  May 15, 1945.

GERALD HAYWOOD, ET AL.

It is hereby certified that error appears in the printed specification of the above numbered patent requiring correction as follows: Page 1, second column, line 23, for the patent number "2,210,268" read --2,210,405--; page 2, first column, line 40, after "either" strike out "or"; and second column, line 57, for "net" read --wet--; page 4, first column, lines 66 and 67, claim 1, for "sulphate" read --sulphite--; page 5, second column, line 15, claim 14, for "acid" read --acidic--; line 18, claim 15, for "finally" read --finely--; and that the said Letters Patent should be read with this correction therein that the same may conform to the record of the case in the Patent Office.

Signed and sealed this 25th day of September, A. D. 1945.

Leslie Frazer (Seal)  First Assistant Commissioner of Patents.